United States Patent [19]
Diamant et al.

[11] Patent Number: 5,530,861
[45] Date of Patent: Jun. 25, 1996

[54] PROCESS ENACTION AND TOOL INTEGRATION VIA A TASK ORIENTED PARADIGM

[75] Inventors: John R. Diamant; Gary L. Thunquest, both of Fort Collins, Colo.

[73] Assignee: Hewlett-Packard Company, Palo Alto, Calif.

[21] Appl. No.: 345,874

[22] Filed: Nov. 28, 1994

Related U.S. Application Data

[63] Continuation of Ser. No. 258,915, Jun. 13, 1994, abandoned, which is a continuation of Ser. No. 749,779, Aug. 26, 1991, abandoned.

[51] Int. Cl.$^6$ .................................................. G06F 9/46
[52] U.S. Cl. ............................ 395/650; 364/DIG. 1; 364/281.3
[58] Field of Search ....... 395/650; 364/DIG. 1 MS File

[56] References Cited

U.S. PATENT DOCUMENTS

| | | | |
|---|---|---|---|
| 4,658,351 | 4/1987 | Teng ........................................... | 395/650 |
| 4,807,142 | 2/1989 | Agarwal ............................. | 364/DIG. 1 |
| 4,825,354 | 4/1989 | Agrawal et al. .................... | 364/DIG. 1 |
| 4,901,225 | 2/1990 | Shiraishi ............................. | 364/DIG. 1 |
| 4,951,190 | 8/1990 | Lane et al. .......................... | 364/DIG. 1 |
| 5,423,023 | 6/1995 | Batch et al. ........................ | 364/DIG. 1 |

OTHER PUBLICATIONS

Kaiser, G. et al., "Preliminary Experience with process Modeling in the Marvel Software Development Environment Kernel"; 23rd Annual Hawaii Int. Conf. in System Sciences; Jan., 1990; pp. 131–140.

*Primary Examiner*—Thomas M. Heckler

[57] ABSTRACT

A task manager for providing personal organization, project management, and process automation capabilities. The task manager maintains a hierarchical list of tasks for an individual. For each task, notes can be kept, priorities set, and progress tracked. Also, subsets of the task hierarchy can be shared. Every task in the task manager belongs to a class, and each class includes pre-defined automatic actions and manual actions. The pre-defined automatic actions are automatically executed by the task manager when the task is being worked on. The manual actions aid in task execution because the relevant operations (that is, the manual actions) are available when the task is being worked on. The task manager communicates with agents, tools, and process engines via a message system. The agents, tools, and process engine may receive task information from the task manager and may also remotely control the task manager.

18 Claims, 6 Drawing Sheets

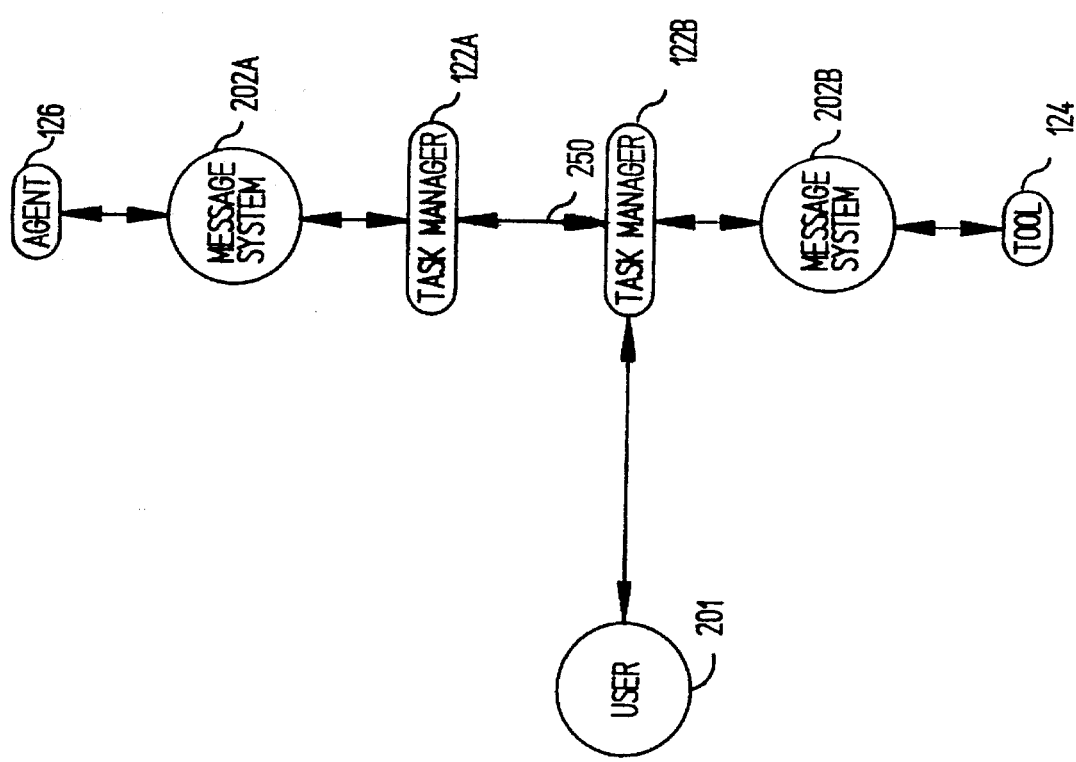

PROCESS ENACTION AND TOOL INTEGRATION VIA A TASK ORIENTED PARADIGM

This is a continuation of application Ser. No. 08/258,915 filed on Jun. 13, 1994, now abandoned which is a continuation of application Ser. No. 07/749,779 filed on Aug. 26, 1991, now abandoned.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field Of The Invention

The present invention relates generally to task management, and more particularly to a computer-based system and method for achieving task management.

2. Related Art

Computer-based tools having limited task management capabilities exist today. These existing tools essentially fall into three categories.

The first category is typified by "Lotus Agenda" and provides for management of task-related data. Tools which fall into this first category are limited in that they do not define hooks to the actual work performed or to project management tools. For example, they cannot automatically track time spent executing tasks. Additionally, tools which fall into this first category are limited because they do not include triggers for automatically initiating actions in the computing environment based on the task which is currently being performed.

The second category is typified by any number of project management tools which are on the market today, such as "XPM" and "Viewpoint." Tools which fall into this second category provide for project tracking, project estimation, and "what if?" analysis. However, these second category tools are limited because they do not include triggers for automatically initiating actions in the computing environment based on the task which is currently being performed. Also, they usually do not provide automatic tracking of time spent executing tasks. Additionally, data entered into these second category tools can only be used by the tools themselves. Such data cannot be easily exported and used by other tools. In general, these systems provide assistance to the project manager but not the task implementer.

The third category is typified by a Columbia University MARVEL project. The Columbia University MARVEL project is described in "Experience with Process Modeling in the Marvel Software Development Environment Kernel" by Gail Kaiser, Naser S. Barghouti, and Michael H. Sokolsky (23rd Annual Hawaii International Conference on System Sciences, January 1990, pages 131–140). In this third approach, a relatively elaborate process engine is used with a process description language for describing software processes including constraints and enactable components. However, systems which fall into this third category are flawed because they use ad hoc mechanisms (or none at all) for communicating with users. In fact, many such third category systems operate entirely without terminals and thus have no mechanism for providing interactive communication with users. Thus, they poorly handle enaction of processes involving manual steps.

SUMMARY OF THE INVENTION

The task manager of the present invention is a computer-based system and method for managing tasks. The task manager is helpful for organizing and coordinating a user's work. The task manager takes project definitions (in the form of task lists) for multiple projects and provides facilities which aid groups of individuals in actually performing the defined tasks.

The task manager provides personal organization, project management, and process automation capabilities. The task manager is very useful when used by a single individual. The task manager is even more; useful when used by teams of people who need to communicate information and responsibility in the progress of their work.

The task manager maintains a hierarchical list of tasks for an individual. For each task, notes can be kept, priorities set, and progress tracked. Also, subsets of the task hierarchy can be shared for constructing project wide views to allow effective project management. To support group work, tasks can be shared between individuals, while keeping changes synchronized between them.

Every task in the task manager belongs to a class, and each class includes pre-defined automatic actions, manual actions, and data relevant to the task. The pre-defined automatic actions associated with a task are automatically executed by the task manager when the task is being worked on. The manual actions aid in task execution because the relevant operations (that is, the manual actions) are available when the task is being worked on. Users can define their own classes with their own actions to model the types of tasks they encounter in their work situations.

The task manager communicates with agents, tools, and a process engine via a message system. The agents, tools, and process engine may receive task information from the task manager and may also remotely control the task manager. Thus, by allowing two-way communication with the entities that are used for performing work (that is, the agents, tools, and process engine), the task manager may be used to perform complex activities.

FEATURES AND ADVANTAGES OF THE INVENTION

The task manager of the present invention includes the following features and advantages.

The present invention provides for direct interaction between users and their tasks. Thus, the present invention may support user's tools and processes to provide traceability between tasks and their artifacts.

The present invention provides for communication of tasks among individuals performing the tasks without losing semantic information.

The present invention provides for task classes.

The present invention associates automatic actions with tasks, wherein the automated actions accomplish or contribute to the accomplishment of the tasks.

The present invention provides for task scheduling and sequencing advice.

The present invention supports task templates wherein generalizations of kinds of tasks and task hierarchies are predefined in text files. Users may create tasks and subtasks from scratch or by using the task templates.

The present invention provides for action inheritance over a task hierarchy.

The present invention accrues actual time spent on tasks and estimates completion time for tasks.

The present invention interacts with external tools (such as project management tools, report generators, and electronic appointment books) such that these tools may generate reports and perform other functions using the task information stored by the task manager of the present invention.

The present invention provides for a message interface wherein the functions of the present invention may be remotely invoked.

The present invention provides for different filtering options for displaying task lists.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE DRAWINGS

The present invention will be described with reference to the accompanying drawings, wherein:

FIG. 2B illustrates a first connectivity architecture of the present invention.

DETAILED DESCRIPTION OF THE PREFERRED EMBODIMENTS

1. Overview

Figure 1:
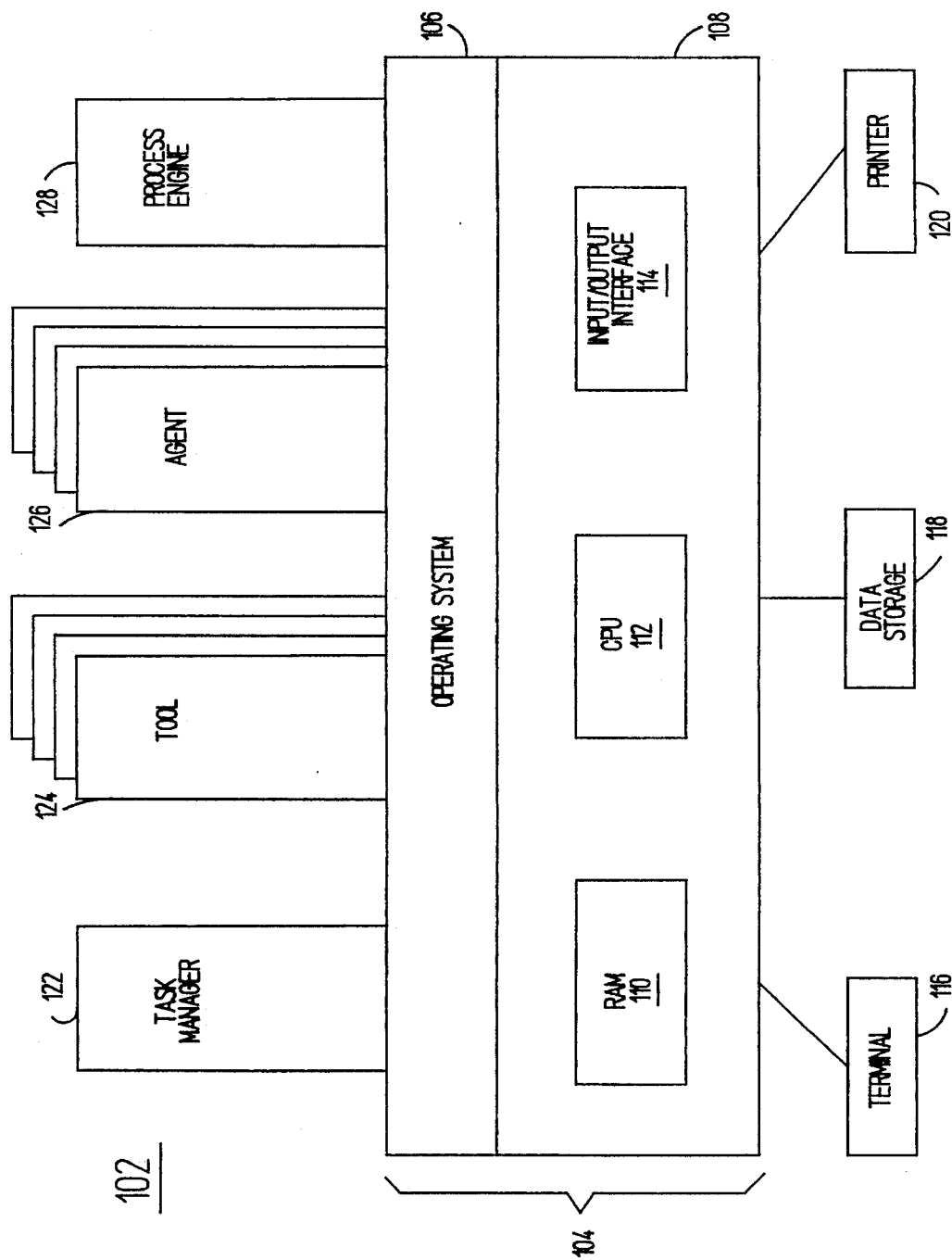
FIG. 1 illustrates a computer system in which a task manager of the present invention operates.

In a preferred embodiment, the task manager of the present invention is a computer program 122. FIG. 1 illustrates a computer system 102 in which the task manager 122 operates.

The computer system 102 includes a computer platform 104 having various hardware components 108. The hardware components 108 include a random access memory (RAM) 110, a central processing unit (CPU) 112, and an input/output interface 114. Various peripherals may be connected to the computer platform 104, such as an "X window system" terminal 116, data storage device 118, and a printer 120. Also, data entry devices may be connected to the computer platform 104. In the preferred embodiment of the present invention, such data entry devices would be a keyboard and a mouse.

The computer platform 104 also includes an operating system 106.

In the preferred embodiment of the present invention, the computer platform 104 is an "Hewlett Packard (HP) 9000/ Series 400 Workstation." The operating system 106 is an "HP-UX" operating system. The task manager 122 is written in the C++ computer programming language. The present invention uses the "HP SoftBench" platform for the messaging system.

Various computer programs operate on the computer platform 104. These computer programs include the task manager 122 of the present invention. These computer programs also include tools 124, agents 126, and a process engine 128.

The tools 124 are user-interactive programs such as editors, compilers, and debuggers.

The agents 126 are similar to tools 124, except agents 126 operate autonomously. An intelligent mail program is an example of an agent 126. A user may instruct the mail program to monitor, sort, and prioritize all incoming electronic mail. The mail program would then operate autonomously to process the user's electronic mail.

The process engine 128 includes a process administration support tool which allows specification of a process. The process engine 128 can be viewed as a collection of agents. The process engine 128 interprets a process modeling language to enact the process.

Figure 2A:
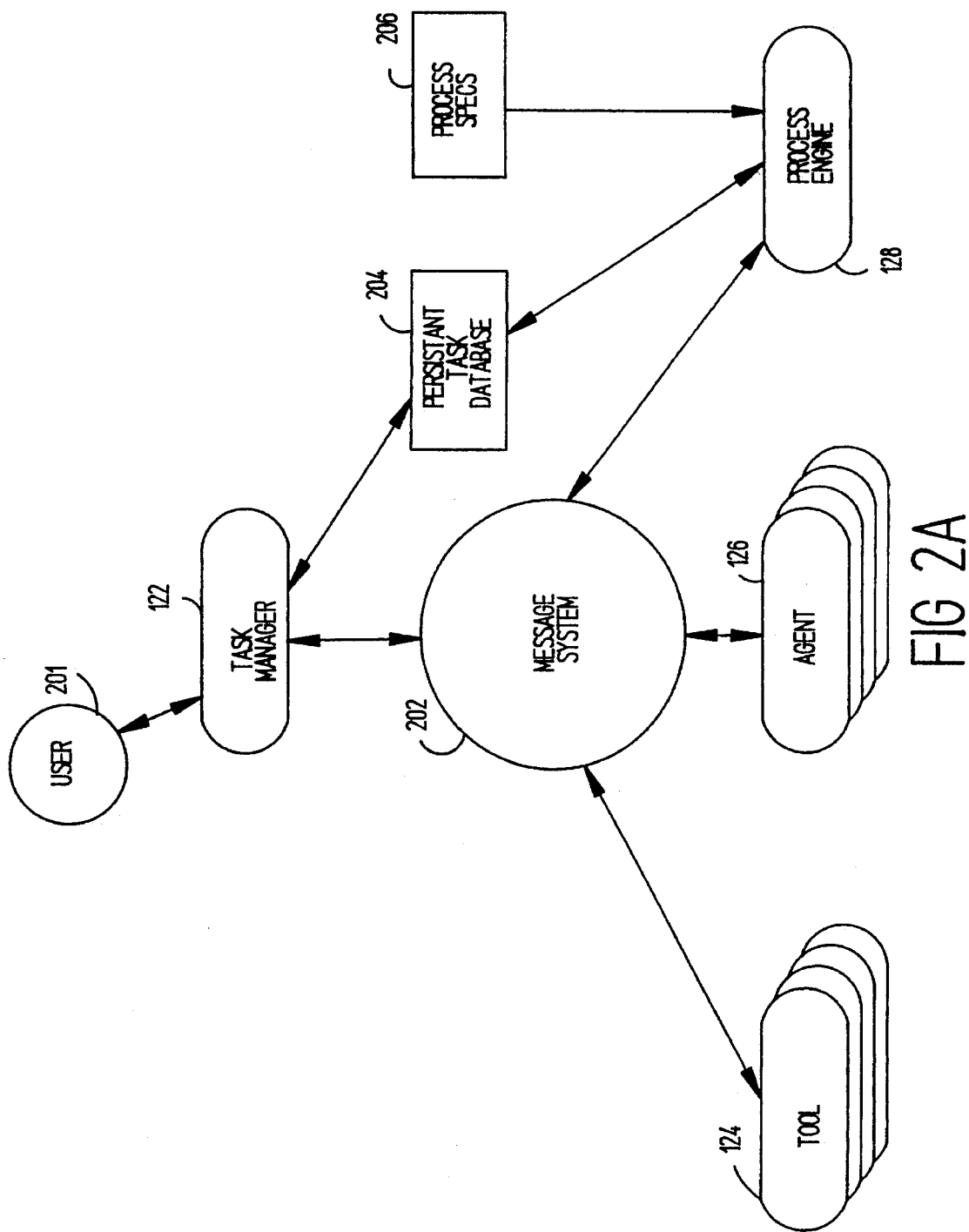
FIG. 2A illustrates an overall architecture of the task manager of the present invention.

FIG. 2A illustrates an overall architecture of the task manager 122 of the present invention. As shown in FIG. 2A, the task manager 122 may communicate with a human operator 201, a process engine 128, the tools 124, and the agents 126. When communicating with the process engine 128, tools 124, and agents 126, such communication is over a message system 202. Communication with the user 201 is via a user interface 302 (discussed below). Both the task manager 122 and the process engine 128 may have direct access to a persistent task database 204.

The message system 202 may be implemented using any communication system which allows data and commands to be transferred between the task manager 122, tools 124, agents 126, and process engine 128. The message system must allow tools (such as the task manager 122), agents, and the process engine to send requests to each other for specific operations, and must allow tools to notify one another of completion of operations. The message functionality should mimic most functionality available through the user interface.

The message system 202 may be implemented, for example, as a broadcast message server (BMS). The BMS is described in a commonly assigned and pending patent application entitled "Method And Apparatus For Communicating Between Tools In A Computer Aided Software Engineering System" (Ser. No.: 07/359,309; Filing Date: May 31, 1989), which is herein incorporated by reference in its entirety.

As shown in FIG. 2A, the task manager 122 interacts with a persistent task database 204. The persistent task database 204 is a backing store for tasks.

According to the present invention, the task manager 122 is the users' primary interface to tasks. Users operate the task manager 122 to create, execute, and delete tasks. An extensible library of task templates exist for aiding users in creating new tasks.

According to the present invention, users may create tasks having specific actions. The task manager 122 aids users in executing the tasks by automatically performing the actions associated with the tasks. For example, if a user selects a "Write Daily Report" task, the task manager 22 may automatically invoke the user's text editor on the appropriate file. If the user selects a "Compile Program" task, the task manager 122 may automatically invoke the user's compiler.

These, and other, aspects of the present invention are described in greater detail below.

2. Task Structure

A task represents a piece of work which needs to be done. A task is defined by pre-defined and user-defined attributes. The pre-defined and user-defined attributes collectively model the work which the task represents.

This section describes the pre-defined attributes. Every task includes at least the pre-defined attributes. The user-defined attributes are described in the following section.

2.1. Title

The task manager 122 automatically assigns a title to a task when the task in created. Users can change the task's title at any time. The title is displayed in a task list 308 (see FIG. 3) and is generally used in all human-readable reports generated from the task manager 122. However, the title is not otherwise interpreted by the task manager 122 (the user is free to use any appropriately descriptive title).

2.2. Unique name

The task manager 122 automatically generates a unique name for a task when the task is created. The unique names are unique identifiers used internally by the task manager 122 to identify tasks. The unique names are globally unique. Thus, the unique names never need be changed, even when tasks are shared with different machines. Messages from the tools 124, agents 126, and process engine 128 refer to tasks using their unique names. Also, whenever a task needs to refer to other tasks (such as parents and children in the hierarchy), the unique names are used.

2.3. Class

This attribute identifies a class of a task. A task's class is selected by the user when the user creates the task or by a template when tasks are created according to the template. According to the present invention, a task class may have multiple actions (also called methods). Tasks having the same task class have the same actions (that is, those defined for the task class). A task class is a generic class if the task class has no actions. Task classes are described further below.

2.4. Type

This attribute is a name for a particular series of process steps. The type attribute is a logical mechanism for defining the work that a person performs. For example, an attribute value "bench_review" may be assigned for work involving code review which is done at an engineer's desk/lab bench. The class attribute, discussed above, is an implementation mechanism for assigning actions with tasks having certain types. Thus, the distinction between a type and a class is that a class is an implementation mechanism for associating actions with types of tasks.

2.5. Task Parent(s)

If a task is a subtask (that is, a task whose completion is part of completing a parent task), then this attribute refers to the parent task.

2.6. Children

This attribute comprises a list of subtasks into which this task has been decomposed.

2.7. Task Creator

This attribute identifies the creator of the task. In the preferred embodiment of the present invention, this attribute is the user's name or agent 126 who created the task.

2.8. Time Estimate

This attribute is a time estimate for the completion of the task.

2.9. Actual Time

This attribute is the actual time spent working on the task. The task manager 122 automatically updates this attribute. This attribute is the sum of the Per User Actual Times and the Non-tracked Actual Time, discussed below.

2.10. Non-tracked Actual Time

This is the time, entered by the user, which indicates the amount of time spent on the task which was not tracked by the task manager 122. This attribute may represent time spent working on the task before the task was entered into the task manager 122.

2.11. Per User Actual Time

This attribute is the actual time which has been spent working on the task (and which has been tracked automatically by the task manager 122). An entry is maintained for each user who has worked on the task. The actual time spent by each user is added together and stored in the user's entry.

The task manager 122 also maintains a tasktimelog file for each user. The tasktimelog file contains a series of entries each having the Unique name of a task, and the start and end time of an execution of that task. The tasktimelog file, however, is not stored with the tasks.

2.12. Task Deadline

This is a deadline for completing the task. The deadline is in a time/date format. The task manager 122 may generate an alarm when a task deadline is approaching. Alternatively, a tool 124 such as an appointment calendar program may request and receive this information. Also, this attribute is available for an Advise Next Task function, discussed below.

2.13. Scheduled Time

This attribute applies for tasks which are scheduled to occur during a specific time range, such as a meeting. A tool 124, such as an appointment calendar program, may request and receive this information from the task manager 122.

2.14. Creation Time

This attribute lists the time that this task was initially created. This information may be requested and received by a tool 124, such as a report generator, in order to perform query/report functions. It is not used directly by the task manager 122.

2.15. Time of last Status update

This attribute lists the time that this task's status was last changed. This attribute is used for automatic archival of tasks. This attribute is also used for determining when a task was completed. Thus, tools 124, such as a report generator, may request and receive this information in order to create a monthly summary report.

2.16. Note Pages

This attribute is a list of named note pages. The note pages may contain any text and/or graphics and may be viewed via a Task:Notes . . . menu item, described below.

2.17. Priority

A numeric priority is attached to each task. The priorities may be displayed in the task list window 308, and are typically used by the Advise Next Task function (described below). Tools 124, such as a report generators, may also request and receive this information.

2.18. Status

Each task will have a status assigned by the user. Status values include Complete, Ongoing, New, and Abandoned. A user's flexibility in setting this attribute is limited by constraints such as "no task may be marked Complete unless all its children are Complete." Status is used in filtering the task list display 308. Status may be requested, received, and used by tools 124 such as report generators to generate monthly reports. Status is used with the Time of last Status update attribute for automatic archiving. For example, a task may be automatically archived to permanent storage when the task's Status is Complete, and the task's Status has not been updated (as indicated by Time of last Status update) for a predefined amount of time.

2.19. Viewed By

This attribute identifies users who have access to view the task. This attribute also indicates whether the users have read-only or read-write access to the task. This attribute also lists Locales (described below). In the preferred embodiment of the present invention, the format of this attribute is as follows: user name, machine (such as an electronic mail address), access flag, and Locale name.

2.20. Owner

This attribute identifies the user who has primary responsibility for the task. This is generally used as a filter upon the tasks so that users may view only their own tasks and generate reports based on them.

2.21. Accepted

This attribute is a flag for indicating whether a task whose ownership was changed has been accepted by the new owner.

2.22. Urgent

This is a flag for indicating whether the task is urgent. It is viewable in the task list 308 as an indicator, and is used by the Advise Next Task function (described below). It is also used for external report generation (such as generating a "to do" list).

2.23. Version

This is a sequence number which is used to determine which version of a task is the most recent. This is used in a synchronization protocol to ensure that an old version of a task does not overwrite a new version of the task when tasks are shared (described below).

2.24. Repository Version

When a task is created, the version number of the task manager 122 is stored in this attribute.

3. User-defined Attributes

The user may add additional attributes to tasks as well. These are described below.

User-defined attributes are in the following form: Name= Value.

Any number of user-defined attributes may be attached to a task.

Pre-defined and user-defined attributes may be set and retrieved in the same way by tools 124 and agents 126. Thus, tools 124 and agents 126 may store and access information about the task by setting and retrieving the task's attributes.

The user-defined attributes may be shared by all users viewing the task, or may be private to a single user. Attributes are private by default, and must be exported to be shared by all users viewing a task.

User-defined attributes may be used to affect display and report generation. For instance, a task may have an attribute "Objectives=Summarize" to indicate that the task should be summarized in an objectives report. A tool 124, such as a report generator, could request that the task manager 122 send it all tasks having the attribute "Objectives=Summarize."

Likewise, attributes may be applied for grouping purposes in order to allow operations on all tasks with a given attribute value (such as a request in the Advise Next Task command to suggest the next task to be started among those tasks having an user-defined attribute "Category=System-Administration").

4. Task Database

The tasks are stored and organized in a task database. The task database may be implemented as either a full database application (such as "ONTOS", "Objectivity", or "PCTE") or a primitive filesystem database (such as a directory per task list and a file per task). The task database may be implemented as either an object-oriented, relational, or entity-relationship database. Such full database applications and primitive filesystem database approaches are well known to those skilled in the art.

The task database may be located in a central database or may be distributed such that each task manager 122 (either operating on the same or different computer platforms) has a copy of the task database.

In the preferred embodiment of the present invention, the task database is distributed such that each task manager 122 has a subset of the task database. The present invention includes a mechanism for transferring synchronized portions of the task database among the task managers 122. This mechanism is necessary for sharing tasks between the task managers 122 and is described further in Section 9.

A task's attributes (both pre-defined and user-defined) are either shared or private. Shared attribute values will be the same for all users who have access to the task (access is granted via the Viewed By attribute). Private attribute values may be different for each viewer of the task. Therefore, copies of the shared attributes must be stored in the task databases associated with all users who have access to the task. Each viewer's private attributes only needs to be stored in his/her own task database. Shared attribute values are synchronized between all viewers' databases, while private attribute values appear only in the databases to whom they belong.

5. Task Classes

Users may define task classes according to the class structure described in this section. Each task class may be associated with multiple actions. When creating a new task, it is created as one of the predefined task classes. The new task then has the actions associated with the predefined task class.

A class definition is a C++ specialization of the C++ generic "Task" class, with appropriate class constructor functions as well as virtual functions defined for any of the hook functions (which are described below).

The task classing mechanism is implemented using C++ objects. Class; definitions are stored in C++ source and compiled using a C++ compiler. The object files may be dynamically loaded into a running Task Manager 122. Alternatively, the object files are linked into a full executable Task Manager 122. Not all users wishing to customize a process will require adding new task classes, as task templates (discussed below) with existing classes may be sufficient.

The class structure contains member functions for several different types of actions: start, receive, create, send, delete, resume, deadline reached, schedule date reached, and status change. These actions are called pre-defined automatic actions because they exist in every class structure.

The class structure also includes manual actions. The manual actions are in the form of label/action pairs and are placed in a registry table. The manual actions also include a flag for indicating whether the manual actions are inherited over the task hierarchy (that is, by descendants). Those manual actions in the registry table are added to and accessible from an actions menu 318 (described below).

Actions (both pre-defined automatic actions and manual actions) are specified as functions or method calls in C++. Appropriate accessor functions are available for accessing the data objects (which are required by the actions) in the current task. In addition, system( ) and send_message( ) functions are provided. System ( ) is a "Unix" command. Send_message( ) is used to send a message (request/ notification) to another tool using the message system.

The pre-defined automatic and manual actions are created consistent with the functionality and purpose of their respective task classes. Thus, for some task classes, some (or even all) of the pre-defined automatic actions may not perform any operations. Also, some tasks may not include any manual actions.

The pre-defined automatic actions are described in the following paragraphs.

A CreateAction(Boolean interactive) pre-defined automatic action is automatically invoked by the task manager 122 when a task is created. The Boolean interactive flag indicates whether the task was created via the user interface 302 (described below) or the message interface.

The CreateAction pre-defined automatic action may create subtasks which are always part of executing tasks of that class. Thus, CreateAction may create a class hierarchy. For example, for an "attend conference" task which always includes two subtasks (such as "actual attendance" and "writing trip report"), CreateAction might create the subtasks (that is, "actual attendance" and "writing trip report") automatically whenever the parent task (that is, "attend conference") is created.

An EditAction( ) pre-defined automatic action is automatically invoked by the task manager 122 when the user wants to edit class data. EditAction( ) may cause a dialog box to appear to allow the user to edit any class-specific attributes which are accessible via the Task/Edit . . . menu function (described below).

A DeleteAction( ) pre-defined automatic action is automatically invoked by the task manager 122 upon the deletion of a task. DeleteAction( ) may include a function to send a message to a tool 124, such as an appointment calendar program, to inform the tool 124 that the task has been deleted. Upon receiving the message, the appointment calendar program would remove a corresponding alarm if one had ever been created for the task (such as for a meeting or deadline).

A ReceiveAction( ) pre-defined automatic action is automatically invoked by the task manager 122 when a task is received via the message system 202. In a "Compile Program" task, for example, ReceiveAction( ) may include a function to automatically compile a program.

A SendAction( ) pre-defined automatic action is automatically invoked by the task manager 122 when the task is sent to the message system 202. Some tasks may want to log all send actions to a file in order to allow the sender to know which tasks of that type he is sending. This might be related to certain checkpoint approval type tasks where traceability is critical. For these tasks, SendAction( ) would perform such logging functions.

A StartAction( ) pre-defined automatic action is automatically invoked by the task manager 122 when the task is started (that is, the task was in the New state and is executed). StartAction( ) may invoke an editor or may send messages to a tool 124, such as a report generator, when its corresponding task is executed.

A ResumeAction( ) pre-defined automatic action is automatically invoked by the task manager 122 when the task is resumed (that is, the task was not in the New state and is executed). ResumeAction( ) generally has the same functionality as StartAction( ). However, some activities may only make sense to perform the first time a task is run (such as resolving a defect). Such activities would be executed by StartAction( ) but not ResumeAction( ).

A DeadlineAction( ) pre-defined automatic action is automatically invoked by the task manager 122 when a task deadline is reached. The task deadline is stored in the Task Deadline attribute. DeadlineAction( ) may generate an alarm or to create a new task to process the deadline.

A ScheduleAction( ) pre-defined automatic action is automatically invoked by the task manager 122 when a scheduled start time is reached. Scheduled start times are stored in the Scheduled Time attribute. ScheduleAction( ) may generate an alarm.

A StatusChangeAction( ) pre-defined automatic action is automatically invoked by the task manager 122 when the task's status is changed. The task's status is stored in the Status attribute. StatusChangeAction( ) may start another task when the status of the current task changes to Complete.

As noted above, these pre-defined automatic actions are automatically executed by the task manager 122 at particular times. For example, consider a task to examine a defect in the process of fixing the defect. StartAction( ) and ResumeAction( ) may operate to display a defect report for that particular defect.

The present invention also defines two additional pre-defined automatic actions:

WriteClassData(ostream&,const StrArray * const)const

Boolean ReadClassData(istream&,const Str *const, Boolean assignment_flag=TRUE)

WriteClassData( ) and ReadClassData( ) are used for writing and reading class specific data. Thus, these actions are used for saving class specific state information for a task.

As noted above, the class structure also includes manual actions. The manual actions (which are in the registry table) are accessible from the actions menu 318. When executing a task, the actions menu 318 is only available when the task's task class includes manual actions. The action menu 318 displays a list of labels corresponding to C++ functions which correspond to the manual actions defined for the current task's task class. Users may execute a manual action by selecting the manual action in the action menu 318. Thus, the action menu 318 facilitates the processing of tasks by acting as a repository of functions (that is, the manual actions) which are often used by users while processing the tasks.

Note that the distinction between the manual actions and predefined automatic actions are that the manual actions are available any time while executing the task (from the action menu 318), and are never invoked automatically, whereas the pre-defined automatic actions are invoked automatically by the task manager 122 at specific times.

An example of a task class structure is shown below in Table 1. In the following, CreateAction( ), StartAction( ), EditAction( ), ResumeAction( ), WriteClassData( ), and ReadClassData( ) are described above. RunAction( ) is an example of a manual action. ActionTable( ) is the registry table for the manual actions.

TABLE 1

```
/************************************************************
* File:          ClassExecute.h
* Description:   Defines "Execute" class of tasks (for executing a
*                random command via system).
Language:      C++
************************************************************/
#ifndef    CLASSEXECUTE_H
#define    CLASSEXECUTE_H
#include <Str.h>
class ClassExecute : public Task {
        Str _exec_sting;    // Sting to pass to system();
        public:
        ClassExecute();
        virtual void    CreateAction(Boolean);
        virtual void    StartAction();
        virtual void    EditAction();
        virtual void    ResumeAction();
```

TABLE 1-continued

```
               virtual const Actions& ActionTable() const;
               virtual Boolean WriteClassData(ostream&, const Str &,
                       Boolean);
                                       // invoked to write task to
                                       stream
               virtual Boolean ReadClassData(istream&, char *attrib,
                       int attrib_size, Boolean assignment_flag-
                       TRUE);
                                       // invoked to read task to
                                       stream
               const Str exec_string() const;
               void exec_strin(const Str&);
       };
       inline const Str ClassExecute::exec_string() const
       {
               return_exec_string;
       }
       inline void ClassExecute::execstring(const Str& s)
       {
               _exec_string = s;
       }
       #endif
       /****************************************************
        * File:              ClassExecute.C
        * Description:   implements execute class (calls system on
        *                                exec_string)
        * Language:          C++
        ****************************************************/
       #include <stdlib.h>
       #include <Xm/Xm.h>
       /* declares functions, such as TmPromptUser, which allows
       interaction with users via dialog boxes.*/
       #include "dialogs.h"
       * defines the task base class*/
       #include "Task.h"
       /* declares a repository of services, such as SaveTask, for
       managing tasks */
       #include "TaskRepository.h"
       #include "ClassExecute.h"
       //
       // Create an object of the Unknown class
       //
       Task *CreateExecuteClass()
       {
               return new ClassExecute;
       }
       //
       // Class constructor
       //
       ClassExecute::ClassExecute()
       {
               _class_name = "Run_Action";
               }
               void system_add(Widget, void *task, char *exec+str)
               {
               ClassExecute *t = (ClassExecute *) task;
               t→exec_string(exec_str);
       }
       void ClassExecute::CreateAction(Boolean interactive)
       {
               if (interactive)
                       TmPromptUser(NULL, "Command String",
                       "What is your execution
                               string: ", NULL
                               (XtCallbackProc) system_add,
                               (caddr_t) this);
       }
       void ClassExecute::StartAction()
       {
               system(_exec_string);
       }
       static void EditActionCB(Widget, ClassExecute *e, char *st)
       {
               if(str != NULL)
               {
                       if(e→exec_string() != str)
                       {
                               e→exec_string(str);
                               task_base→SaveTask(*(Task *)e);
```

TABLE 1-continued

```
                       }
               }
       }
       void ClassExecute::EditAction()
       {
               TmPromptUser(NULL,"Cmmand String", "Execution
               String: ",
               exec_string(),
               (XtCallbackProc) EditActionCB, (caddr_t)this);
       }
       void ClassExecute::ResumeAction()
       {
               system(_exec_string);
       }
       Boolean ClassExecute::WriteClassData(ostream& out, const
       Str &sa,
               Boolean /*for_sharing*/)
       {
               if (sa == NULL | | sa == "Execute-string")
               {
                       out <<"Execute-String: " << _exec_string
                       <<'\n';
                       if(sa != NULL)return TRUE;
               }
               return FALSE;
       }
       Boolean ClassExecute::ReadClassData(istream& in, char *atttrib,
               int attrib_size, Boolean /*assignment_flag*/)
       {
               if(strcmp(attrib, "Execute-String") == 0)
               {
                       in.get(attrib, attrib_size);
                       _exec_string = attrib;
                       return TRUE;
               }
               return FALSE;
       }
       void RunAction(Task &t)
       {
               system(((ClassExecute &) t).exec_string());
       }
       const Actions& ClassExecute::ActionTable() const
       {
               static actions execute_action_table[]= {{"Rerun
               Command",
                       RunAction},{NULL, NULL}};
               static Actions ret = { FALSE, execute_action_table };
               return ret;
       }
```

Copyright Hewlett-Packard Company, 1991, All Rights Reserved

According to the present invention, the task actions (both predefined automatic actions and manual actions) may be task instance specific, rather than class specific. This is accomplished by having the task instances store actions in task attribute values. When a task instance is executing, the class action functions could then access the task attribute values associated with the task instance in order to determine the task action to execute. A general task class of the above type may be the only task class required in such an embodiment. In this patent document, the terms "task" and "task instance" are synonymous.

6. Templates

According to the present invention, users may use templates to create tasks. A template may define a single task or a hierarchy of multiple tasks and subtasks. When creating a task, a user may create the task from scratch, or may select a pre-defined task template. Thus, the task template mechanism of the present invention facilitates the creation of new types (see Section 2.4).

The templates are text files containing hierarchical descriptions of tasks and subtasks. The templates include values for many of the task attributes (described above). Other values of task attributes must be supplied by the user.

When the user selects a template, the task manager reads the template and creates the tasks and subtasks described therein.

Any format which describes a hierarchy of tasks and subtasks, including their attributes, may be used to implement the templates (as long as the task manager 122 is implemented in a consistent manner so that a tool can read and properly interpret the templates to send appropriate task creation commands to the task manager). One possible format for implementing the templates is shown by way of illustration in Table 2, below.

TABLE 2

| | | | |
|---|---|---|---|
| # 1st field: | numbered by section and subsection to show hierarchy | | |
| # 2nd field: | Task title | | |
| # 3rd field: | estimated time in days | | |
| # 4th field: | non-tracked actual time (not normally used) | | |
| # text between titles: note associated with each task | | | |
| 1 Inspection: DESCRIPTION | | 0 | 0 |
| 1.1 inspection kickoff meeting | | .0625 | 0 |
| 1.2 inspection preparation | | .375 | 0 |
| Read all code and supplemental materials. Use checklist to monitor for omissions and certain classes of defects. Record amount of preparation time (from task manager or elsewhere). | | | |
| 1.3 inspection meeting | | .375 | 0 |

Copyright Hewlett-Packard Company, 1991, All Rights Reserved

7. User Interface

Figure 3:
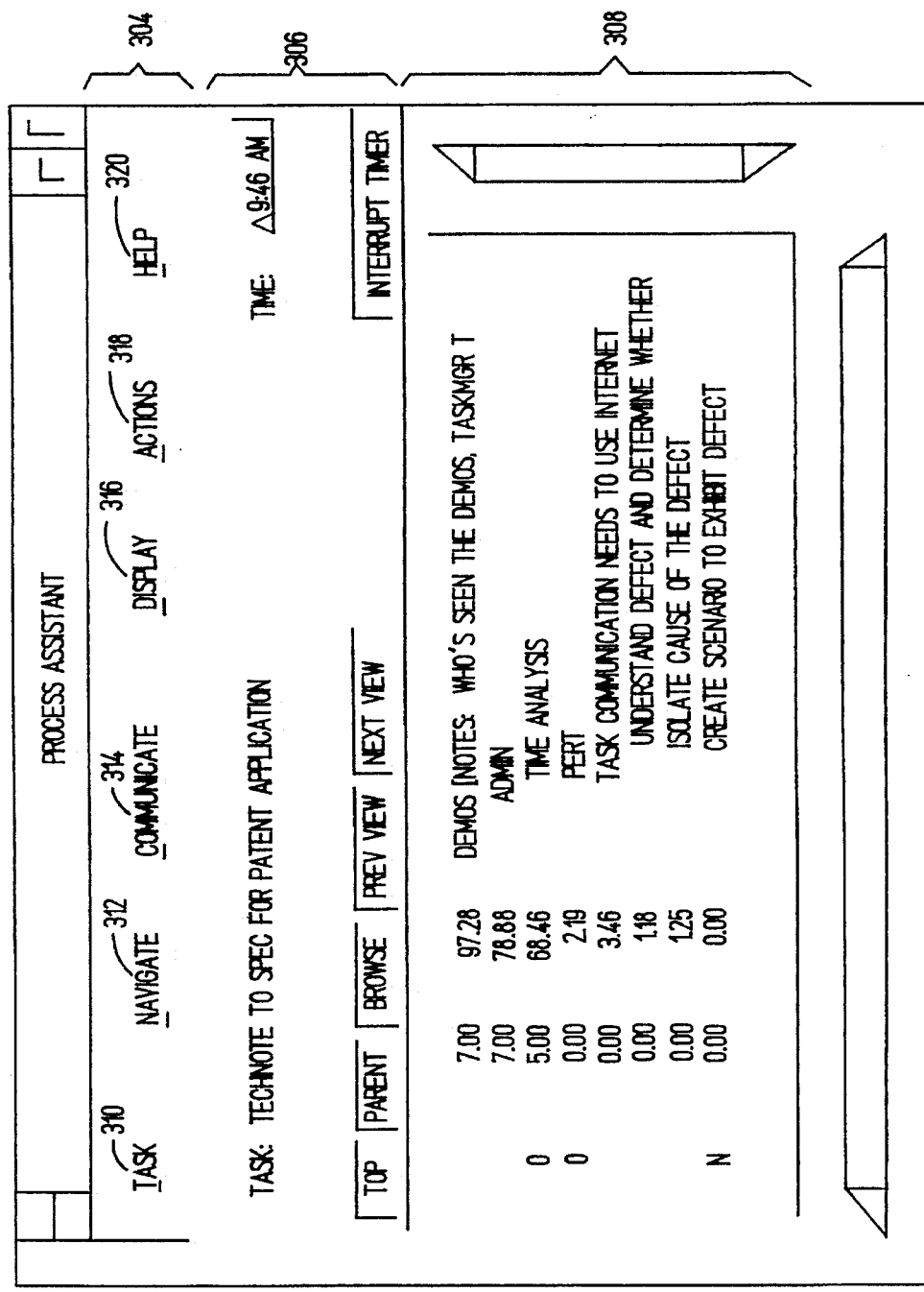
FIG. 3 illustrates a user interface according to a preferred embodiment of the present invention.

The task manager 122 of the present invention includes the user interface 302. FIG. 3 illustrates the user interface 302 according to a preferred embodiment of the present invention.

Users may access their tasks via the user interface 302. There are a certain set of operations which are needed for task management which the task manager 122 makes available at all times. There also exists a set of operations which are specific to the type of task being viewed. These operations are available to users via the Actions menu 320 (described further below).

The user interface 302 contains three primary areas: menu bar 304, status and frequent operation area 306, and task list area 308. Users perform work by using the functions in the status and frequent operation area 306 to find a desired task. The desired task is displayed in the task list area 308. The users then select and process the desired task by clicking on the task and using the functions available from the menu bar 304.

The status and frequent operation area 306 includes a Time area, interrupt timer, Top, Parent, Browse, Prev View, and Next View buttons, and a Task label.

The Time area displays the time which is used as the starting time for the next task. The Time area is editable. This allows a user to "set back the clock" to specify that a task began in the past, rather than now. Once a task is started or resumed, the time will change to begin tracking the current time regardless of what value it was edited to display. The Time area may be frozen by pressing the Interrupt Timer button. The frozen time is used as the start time when a task is started or resumed. In this case, the time value changes to begin tracking the current time again. The Interrupt Timer button is a toggle and thus the interrupt can be disabled. Note that, while tracking the time in the Time area, the task manager 122 updates the Actual Time and Per User Actual Time attributes.

The Top, Parent, Browse, Prev View, and Next View buttons are used to navigate within the hierarchical task list. Top causes the top level list of tasks to be shown in the task list area 308. Parent causes the parent task of the task shown to be displayed. Browse (which requires a task to be selected) displays the subtasks of the selected task (this is equivalent to using a mouse to double click over the task).

The "Task:" label precedes the task which is being worked on. A history of tasks which have been modified or executed recently is available via the Prev View and Next View buttons.

The task list 308 contains a list of tasks. Tasks may be selected by clicking over them with the mouse. Double clicking over a task causes the task's subtasks to be displayed (this is the same as Browse).

Each line in the task list 308 displays one task. For each task, the task's Title attribute is displayed in order to identify the task. To the left of the description is an area for annotations. These annotations convey information such as whether the task has subtasks and whether the task is new. The annotations also identify the task owner and indicate the task status. The annotations are displayed based on information in the task's attributes. The set of displayed attributes is selected via Display:Preferences.

Figure 4:
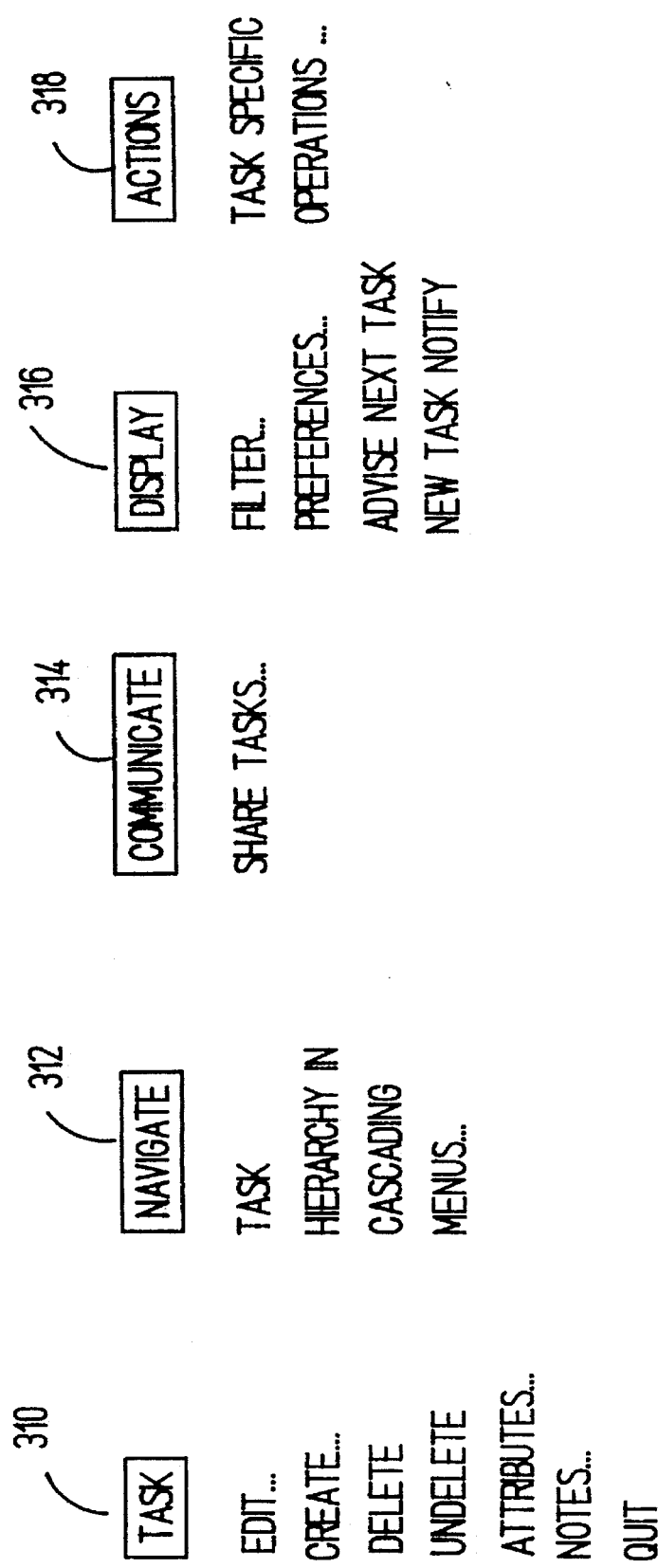
FIG. 4 illustrates five menu categories and their respective functions according to a preferred embodiment of the present invention.

Via the menu bar 304, users may select functions to maintain, organize, and process their tasks. The functions offered by the menu bar 304 are grouped into the following menu categories: task menu 310, navigate menu 312, communicate menu 314, display menu 316, actions menu 318, and help 320. Help 320 provides information on using the functions offered in the other five menu categories. FIG. 4 illustrates the other five menu categories and their respective functions. These functions are described below.

7.1. Task Menu

The task menu 310 contains the following functions: edit, create, delete, undelete, attributes, notes, and quit. These functions are described in the following paragraphs.

The edit function is used to modify the pre-defined attributes of the selected task. When the edit function is selected, the task manager 122 displays a dialog box which displays the attributes for the selected task. The attributes may then be modified.

The create function is used to create a new task. When the create function is selected, the task manager 122 displays a dialog box and allows a new task to be created. The user may create the new task by using one of the pre-defined templates.

The delete function is used to delete all of the currently selected tasks.

The undelete function is used to undo the last delete operation.

The attributes function is used to modify and/or create user-defined attributes for the selected task.

The notes function allows notes (which are stored in the Note Pages attribute) to be created and/or modified.

The quit function is used to exit the task manager 310.

7.2. Navigate Menu

The navigate menu 312 is used to quickly navigate through the hierarchy of tasks to find a specific task. A hierarchy of cascading menus is presented when Navigate is selected. Each menu level corresponds to a level in the task hierarchy. Tasks may be quickly located by moving through the cascading menus (rather than by using the Top, Parent, and Browse buttons in the status and frequent operation area 306 to scroll sequentially through the task list 308).

7.3. Communicate Menu

The communicate menu 314 is used to share tasks among users.

A share task function in the communicate menu 314 allows a user to manage the share list for a task and its descendants (that is, the share task function allows users to edit the Viewed By attribute). According to the present invention, a task is shared among users by changing the task's Viewed By attribute such that other users obtain read or read/write access. The task manager 122 physically transfers tasks to other task managers 122 if such transfer is needed to share the tasks. The mechanism for transferring tasks among task managers is described in Section 9.

Note that actual ownership of the task (that is, the Ownership attribute) is managed via the Edit function in the task menu 310.

7.4. Display Menu

The display menu 316 has the following functions: filter, preferences, advise next task, and new task notify.

Filter is used to organize the tasks in the task list 308. When filter is selected, a dialog box is displayed which lists multiple types of filters which can be applied to the tasks in the task list 308. For example, users may select a filter such that only tasks with a certain owner or set of status values are displayed. Users may also use the filter function to control the depth of the display on the task list 308 (that is, to specify how many levels of the task hierarchy to display at one time).

Preferences is used to specify which task attributes should be display as annotations in the task list area (such as owner, priority, urgent flag, actual time, and estimated time) for each task which passes the current filter.

Advise Next Task is used to allow the task manager 122 to suggest to the user a list of tasks which should be executed next. The task manager 122 makes its suggestion based on task attributes and a heuristic algorithm (which is configurable by the user). Note that the heuristic algorithm is necessary since some of the task attributes (such as priority and deadline) may be conflicting.

New Task Notify has two settings: enabled and disabled. If New Task Notify is enabled, then the user is notified when new tasks are sent to him. New tasks are sent to the user when someone, other than the user, changes the ownership of a task to the user. Note that the present invention includes a mechanism for physically sending tasks between task managers. This mechanism is described in Section 9.

7.5. Actions Menu

As noted above, the actions menu 318 lists the manual actions which are associated with the task class of the executing task. Users may execute these manual actions by selecting them from the actions menu 318. These manual actions are specific to each task class.

7.6. Popup Menu

The popup menu is not available from the menu bar 304. Rather, the popup menu is available when the user presses one of the buttons on the mouse over the task view area. The popup menu is available when the user presses the rightmost mouse button.

The popup menu includes the following functions: Start/Resume, Complete, Select for Move, Move Before, Move After, and Move Under. These functions are described below.

Start/Resume is used to start or resume execution on the selected task. Only one task may be selected. When a task is executing, its Title attribute is put beside the Task label in the status area 306, and the task timer begins accumulating time for the task. The accumulated time is stored in the Actual Time and Per User Actual Time attributes. The log of the execution is stored in the tasktimelog.

Complete is used to mark a task as complete. That is, the Status attribute is changed to Complete.

Select for Move is used to mark the selected task as the one to be moved in the task hierarchy via any of the move operations below.

Move Before is used to move the marked task before the currently selected task in the task hierarchy (that is, the marked task becomes an earlier sibling).

Move After is used to move the previously marked task after the currently selected task in the task hierarchy.

Move Under is used to move the previously marked task under the currently selected task in the task hierarchy (that is, the marked task becomes the child of the currently selected task).

8. Task Manager Message Interface

According to the present invention, all task manager operations which are available from the user interface 302 are also available via messages. Thus, the task manager may be remotely controlled by nonuser entities (that is, entities which do not access the task manager via the user interface) such as the process engine 128, agents 126, and tools 124 such as report generators. The messages are transferred via the message system 202.

An agent, unlike a tool, is autonomous. It does not interact with users. For example, an agent (which might be acting through a process engine) might implement the following:

If any "checkin" request occurs, run the file through a metric.

If the metric passes, allow the "checkin" to succeed.

If it fails, create a task for the requestor to fix the file (with a completion action of automatically performing the "checkin").

A non-user entity and a user may operate with the same task manager. Alternatively, a non-user entity may operate with its own copy of the task manager. For example, a control services agent, like a defect routing script, is not associated with any one user and thus is likely to have its own task manager.

FIG. 2B illustrates a connectivity architecture of the present invention, wherein an agent 126 and a user 201 are operating with different task managers 122. Note that the user 201 and a tool 124 are operating with the same task manager 122B.

In FIG. 2B, the agent 126 operates with a task manager 122A. The user 201 operates with a task manager 122B. The task managers 122A, 122B communicate (that is, share tasks) via a communication network 250. Such communication is described further in Section 9.

Regarding FIG. 2B, note that the agent's and user's task managers 122A and 122B may be operating on the same computer platform, or may be operating on multiple computer platforms which are connected via a communication network. The communication of tasks between the task managers 122A, 122B for both cases is essentially the same (again, this is described in Section 9).

To create and send a new task to a user, a non-user entity would access its task manager (whether separate from or shared with the user) via a message over the message system 202 in order to create a new task (using the create function in the task menu 310). Then, the non-user entity would send a message to its task manager 122 over the message system 202 in order to share the new task with the user (via the share task message function corresponding to the communicate menu 314).

The non-user entity may also receive task information from its task manager 122 by sending messages to its task manager 122 over the message system 202. Note that the user must share his tasks with the non-user entity (via the Viewed By attribute) if he wishes the non-user entity to have access to his tasks.

The non-user entities use this task information to perform their work. For example, a project management/scheduling program may use the information in the Task Deadline and Scheduled Time attributes to generate a schedule for completing the tasks. A report generator can use the information in the Time Estimate, Actual Time, and Status attributes to generate a report containing the amount of time necessary to perform the completed tasks and the amount of time left to complete the pending tasks.

Thus, the task data entered by the user into the task manager 122 is not used only by the task manager 122. Rather, the task manager 122 of the present invention allows non-user entities (such as tools, agents, and the process engine) to easily access and use the task data.

The messages supported by task manager 122 are described below. There are two attribute values which control message access to task data. These attribute values are stored in the task database along with their corresponding tasks. If a task has an Access=Deny attribute value, then messages cannot access the task or any of its subtasks. If a task has an Access=Deny-Subtasks attribute value, then messages can access the task, but none of its subtasks.

In the following, Request refers to a message which requests an operation of a tool (such as the task manager). The operations are generally the ones available in the user interface.

Notify refers to a notification message sent by a tool to signify successful completion of an operation.

Failure refers to a notification message sent by a tool to signify a failure to perform an operation.

The following message returns a list of task identifications (that is, the Unique name attribute). When a task is found with the requested attributes, then the True/False flag controls whether subtasks of this task should be searched for more tasks with the requested attributes.

Request TASKMGR Get-Tagged-Tasks "True"/"False" values . . .

Notify TASKMGR Get-Tagged-Tasks task-ids . . .

Failure TASKMGR Get-Tagged-Tasks error message

The following message returns the unique name attributes of all of the task.

Request TASKMGR Get-Tasks

Notify TASKMGR Get-Tasks taskids . . .

Failure TASKMGR Get-Tasks error message

The following message returns the task hierarchy from the task root or from any other task in the hierarchy. The tree structure is conveyed by causing a task's children to be listed after the parent task-id, and surrounded by parenthesis.

Request TASKMGR Get-Task-Hierarchy [task-id]

Notify TASKMGR Get-Task-Hierarchy parent-task-id (child-task-ids . . . ) . . .

Failure TASKMGR Get-Task-Hierarchy error message

The following message returns data attributes of a task. The message lists the attributes wanted (using the same attribute names as are found in the task data files, that is, "Title", "Children", etc. or user defined attributes names) and the values are returned. Class specific data attributes may be queried as well. The -i option indicates that the requested attributes may be inherited from the parent task if not present on the requested task.

Request TASKMGR Get-Task-Info [-i] task-id attributes . . .

Notify TASKMGR Get-Task-Info values . . .

Failure TASKMGR Get-Task-Info error message

The following message returns the identification of the currently executing task.

Request TASKMGR Get-Execute-Task

Notify TASKMGR Get-Execute-Task task-id|"none"

The following message returns the identification of the currently selected task.

Request TASKMGR Get-Selected-Task

Notify TASKMGR Get-Selected-Task task-id

Failure TASKMGR Get-Selected-Task error message

The following message allows the data attributes for a task to be set to new values. Both pre-defined attributes and user-defined attributes may be set.

Request TASKMGR Set-Task-Info task-id {attribute":" value/n}+

Notify TASKMGR Set-Task-Info

Failure TASKMGR Set-Task-Info error message

The following message causes a new task to begin executing.

Request TASKMGR Set-Execute-Task task-id

Notify TASKMGR Set-Execute-Task

Failure TASKMGR Set-Execute-Task error message

The following message adds a note to an existing task. If a note with the given title already exists, the new note is appended to the existing one. Use of "FILE" causes the contents to be taken from the given filename.

Request TASKMGR Add-Note task-id note-title/n{"FILE" filename}|{"TEXT" note-text}

Notify TASKMGR Add-Note

Failure TASKMGR Add-Note error message

The following message returns the name of the user running the task manager.

Request TASKMGR Who-Am-I

Notify TASKMGR Who-Am-I username

The following message creates a new task. Once created, Set-TaskInfo can be used to initialize the other task data attributes.

Request TASKMGR Create-Task class-name parent-id title

Notify TASKMGR Create-Task task-id

Failure TASKMGR Create-Task error-message

The following message causes a task to be selected in the task display area.

Request TASKMGR Select-Task task-id

Notify TASKMGR Select-Task

Failure TASKMGR Select-Task error-message

The following message causes an Edit->Task Data . . . user interface dialog box to be popped up for the given task.

Request TASKMGR Edit-Task task-id

Notify TASKMGR Edit-Task

The following message returns all of the execution durations intersecting the intervals given. The start-time and end-time are textual descriptions of a time, and are parsed to determine a time_t equivalent.

Request TASKMGR Get-Time-Data start-time/n end-time

Notify TASKMGR Get-Time-Data [start end task_id/n]*

Failure TASKMGR Get-Time-Data error-message

The following message can be used to replace a range of executions with a new set of executions. The actual times on tasks reflect the new execution times.

Request TASKMGR Replace-Time-Data start-time_t/n [start end task_id/n]*

Notify TASKMGR Replace-Time-Data

Failure TASKMGR Replace-Time-Data error-message

The following message can be used to reset the export bit on a set of user defined attributes associated with a task.

Request TASKMGR Unexport-Attributes task-id attribute-names . . .

Notify TASKMGR Unexport-Attributes

Failure TASKMGR Unexport-Attributes error-message

The following message sets the export bit for a set of user defined attributes for a task. Exporting causes the attribute value to be visible to all people sharing the task. An attribute need not exist for it to be exported.

Request TASKMGR Export-Attributes task-id attribute-names . . .

Notify TASKMGR Export-Attributes

Failure TASKMGR Export-Attributes error-message

The following message can be used to delete a set of user defined attributes for a task. Both exported and non-exported tasks may be deleted.

Request TASKMGR Delete-Attributes task-id attributes-names . . .

Notify TASKMGR Delete-Attributes

Failure TASKMGR Delete-Attributes error-message

9. Task Sharing

As noted above, the task manager 122 of the present invention provides a task sharing mechanism for transferring task data between task managers 122. The task managers 122 may be operating on the same computer platform. Alternatively, the task managers 122 may be operating on different computer platforms. The task sharing mechanism of the present invention is described in this section.

The task sharing mechanism of the present invention allows tasks to be shared among individuals using the task manager 122, and also among individuals not using the task manager 122. This is accomplished by using electronic mail (email) messages. Task manager users can send tasks to non-task manager users. The task manager sends the tasks as email messages to non-task manager users. The non-task manager users would not be able to update the tasks unless they started using task manager. Note that, since email messages are used to transfer tasks among users, the task sharing mechanism of the present invention may support wide area sharing that is not limited to a local area network.

The task sharing mechanism of the present invention allows a set of users to share a task. The users may have either read-only or read-write access to the task. While the task is being shared, the task's data is synchronized among those sharing the task. To manage simultaneous updates to the task by more than one user at a time, a locking scheme is used. The locking scheme is not visible to the users, except when exclusive access cannot be obtained. Note that, in this section, the terms "individuals" and "users" refer to both human operators and the agents 126.

The task sharing mechanism of the present invention employs the "Network File System" (NFS). NFS is well known to those skilled in the art, and is described in many publicly available documents.

To simplify locking over a wide area network, the task manager 122 places some restrictions on read-write access. Specifically, the task manager 122 divides all users sharing a task into locales. Two users are in the same locale if they are communicating via NFS to an agreed upon lock repository and thus reside on a single local area network (LAN). Within a locale, all users with read-write access to a shared task can lock that task using the lockf(2) system call, which is a well known NFS system call. The lockf(2) system call uses the NFS lock daemon in a local area network. Only the users with read-write access to a shared task within one locale at a time are allowed to lock the task. The one locale wherein user read-write access is allowed is the locale in which the owner of the task resides. All users with read-write access outside the owner's locale are not allowed to exercise their read-write access until ownership is moved to a user in their locale.

All communication of task data between individuals is done using structured email messages with a sendmail alias per machine (this is a standard alias not requiring customization on each machine) to receive the data and update the user's task database.

Figure 5:
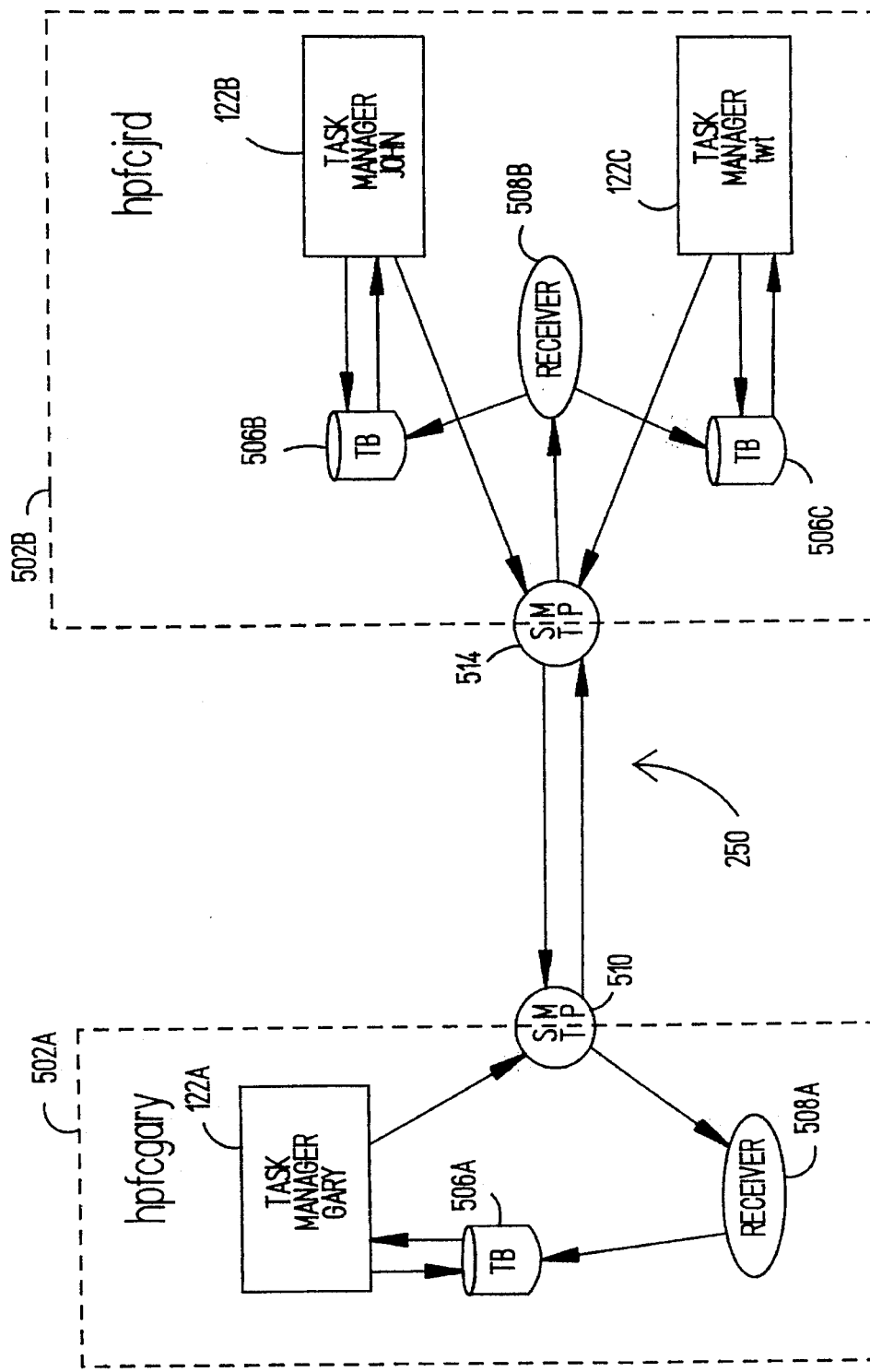
FIG. 5 illustrates a second connectivity architecture of the present invention.

Referring to FIG. 2B, task managers 122A, 122B are connected via a network 250. Such connectivity is shown in greater detail in FIG. 5. FIG. 5 shows two machines (that is, computer platforms) 502A, 502B connected via a network 250 (either a local area network or a wide area network). The machines 502A, 502B are connected to the network 250 using SMTP (Simple Mail Transport Protocol) 510, 514. The machine 502A has a user Gary operating on a task manager 122A. The task manager 122A has a task database 506A.

The machine 502B has users John and TWT operating on task managers 122B and 122C, respectively. The task managers 122B and 122C have task databases 506B and 506C, respectively.

The machines 502A, 502B have task-receivers 508A, 508B.

For the system shown in FIG. 5, the generic sendmail alias is as follows:

task-manager: "!/usr/bin/task-receiver"

The task-receiver in the sendmail alias refers to a setuid root program which has the ability to write to an "inbox" for each local task manager process, and to connect with each local task manager process to instruct it to go read its "inbox". Thus, there is a task-receiver 508A, 508B operating on each of the machines 502A, 502B. The task manager moves data from its "inbox" to the task database 506.

When user UA on system SA shares a task with user UB on system SB, user UA's task manager 122 specifies "UB@SB" as the person to share the task with. If both users UA and UB are on the same machine (such that UB is known as a local alias on system SA), then user UA's task manager 122 does not have to specify the machine. Rather, user UA's task manager 122 would look up user UB's alias and determine that it was UB@SB and send mail to "task-manager@SB" with the destination field specifying the receiver of the task.

For example, consider a scenario where user TWT wants to share a task with user John. In this scenario, the source and destination are on the same machine 502B. Note that the following explanation also applies when the source and destination are on different machines (except that email messages would have to be routed across the network 250).

As described above, to share a task, user TWT would use the Share Task function in the Communicate menu 314 of his task manager 122C. The task manager 122C first places the task in a structured email message. The task manager 122C would then send the email message from its task database 506C, at <twt@hpfcjrd>, to John at <john@hpfcjrd>. "john" is an alias which exists on hpfcjrd, so the task manager 122C forwards the email message to "john". Specifically, the task manager 122C looks up the user "john" and finds that it is an alias for "john@hpfcjrd". The task manager 122C rewrites the address as "taskmanager@hpfcjrd" and adds "Destination:john@hpfcjrd" to the task description and then sends the email message to the task-receiver 508B.

The task-receiver 508B on hpfcjrd sees the destination and checks to see if John runs a task manager 122 (by looking for a task list directory in John's home directory or some other specified location). If John runs a task manager 122, then the task-receiver 508B delivers the email message to John's task manager's inbox and notifies John's task manager 122B (via a socket). John's task manager incorporates the new data into the database. If New Task Notify is enabled in the Display menu 316 of the task manager 122B, then the task manager 122B would inform John of the new task.

If John does not run a task manager 122, then the taskreceiver 508B sends the email message intact to "john" on the local machine. The English part (that is, task title and notes) would be given first. Then a bar (that is, a separator) and the semantic data would be included afterwords.

Table 3 illustrates the structure of the email message. Note that the task attributes are embedded in the email message. Note also that, by using email messages as in Table 3 to share tasks, semantic information of the tasks is preserved.

TABLE 3

Message-Id:<9004042019.AA122.03
@hpfcjrd.sde,hp.com>
To:task-manager@hpfcjrd.sde.hp.com
Subject:task delegation
Date:Wed, 04 Apr 90 14:19:11 MDT
From:Tim <twt@hpfcjrd.sde.hp.com>
FROM twt@hpfcjrd.sde.hp.clm
DESTINATION john@hpfcjrd.sde.hp.com
BEGIN-UPDATE
BEGIN-TASK
BEGIN-TASKDATA
Class:Unknown
Name:33779hpfcgt-gary
Version:13
Time-Estimate:3
Initial-Actual-Time:0
Per-User-Time-Total:gary 10800
Per-User-Time-Total-jenings 0
Parents:33716hpfcgt-gary
Title:fix XeInitialize core dump in XmPutResource
       when using color object
Owner:gary
Creator:gary
Creation-Time:1991-03-19 09:23:23 MST
Accepted:True
Status:Completed
Last-Status-Change:1991-03-27 13:44:25 MST
Priority:70
Urgent:False
Viewed-By:gary@hpfcgt.sde.hp.com True myLocale
Viewed-By:diamant@hpfcjrd.sde.hp.com True
       myLocale
Viewed-By:gerety@hpfccg.sde.hp.com True myLocale
Viewed-By:twt@hpfcjrd.sde.hp.com True myLocale
END-TASKDATA
END-TASK
END-UPDATE Copyright Hewlett-Packard Company, 1991, All Rights Reserved As shown in Table 3, only non-empty fields are included in the structured email message. The format shown in Table 3 is the same that is used in a file-based database. Sendmail automatically performs queuing when a machine or network is unavailable. Even if a destination task manager 122 is not running, the alias can still process the email and update the destination task database 506.

If a task being shared has subtasks, the subtasks are included in the email message. The task-manager splits the message into individual tasks and stores each separately. The task manager 122 is responsible for notifying the user and allowing the user to examine the tasks.

10. Task Manager Scenario

The structure and operation of the task manager 122 are further described below by considering two scenarios. In the first scenario, the task manager 122 is not operating with the process engine 128. In the second scenario, the task manager 122 is operating with the process engine 128.

10.1. With Task Manager Without Process Engine

The first scenario involves developing computer software. Specifically, the first scenario focuses on how a software developer would use the task manager 122 in order to facilitate the debugging of computer software.

John, the software developer, arrives at his office and logs in. The screen displays the user interface 302 of his task manager 122. John scrolls through the task list 308 and selects a "Read Electronic Mail" task (by using the Start/Resume function in the Popup Menu). The ResumeAction ( ) associated with the "Read Electronic Mail" task automatically invokes John's mailer program.

John uses the mailer program to read his electronic mail. While reading his electronic mail, John finds out that he has been requested to make a presentation at a conference. John exits the mailer program and returns to the user interface 302.

John then uses the Create function in the Task Menu 310 to create a new task. John may enter the new task from scratch or may use an existing template. Note that, by using a template, many of the task attributes will be automatically filled in. Which attributes are automatically filled in depends on the subject matter of the template. The new task is a request to John's manager for permission to present at the conference. The deadline for responding to the conference committee is one week from today so John sets the Deadline attribute to be the same as the deadline for responding to the conference committee.

Then, John shares this task with his manager by using the Share Task function in the Communicate menu 314 and changes the owner of the task to be his manager.

John then scrolls down the task list 308 and finds a "Defects" task. John uses the mouse to double click on this task in order to display the subtasks of the "Defects" task (John could have displayed these subtasks in many other ways, such as using the Navigate Menu 312).

Each subtask of the "Defects" task represents a defect (that is, a bug) in the computer program which John needs to investigate and resolve.

Each subtask of the "Defects" task has six sub-subtasks. The six sub-subtasks are listed as follows: "Examine Defect and Determine whether to fix", "Reproduce and Isolate Defect", "Modify Code", "Run unit tests", "Check in changed code", and "Resolve defect at next integration build." Each of these sub-subtasks must be marked as complete (in their Status attributes) before the Defeat subtask can be marked as complete.

John double-clicks on the first subtask of the "Defects" task for processing. The menu list 308 then displays the six sub-subtasks of the selected subtask. John selects the "Examine Defect and Determine whether to fix" sub-subtask as his current activity. The task manager 122 automatically executes a StartAction( ) (or ResumeAction( )) that is associated with the "Examine Defect and Determine whether to fix" sub-subtask. In this particular case, StartAction( ) invokes a reporting utility (that is, a tool 124) which displays a defect report. The defect report contains information regarding the defect. The defect report indicates that the problem is an abort which occurs when the program is run in a certain sequence. The sequence is documented in the defect report.

Note that the task manager 122 had been keeping track of the time that John spent while processing the "Examine Defect and Determine whether to fix" sub-subtask. The task manager 122 automatically uses this information to update the Actual Time and Per User Actual Time attributes.

John next selects the "Reproduce and Isolate Defect" sub-subtask as his current activity. The task manager 122 automatically executes a StartAction( )(or ResumeAction( )) that is associated with the "Reproduce and Isolate Defect" sub-subtask. In this particular case, StartAction( ) invokes a debugger. Alternatively, StartAction( ) may ask John whether he wants the debugger to be invoked, and if so, what executable to bring it up with. In any case, the debugger is invoked and John proceeds to follow the instructions in the defect report. Using the debugger, John reproduces the defect and examines the state of the application when it aborted. He immediately realizes that there is an uninitialized pointer.

John next selects the "Modify Code" sub-subtask as his current activity. The task manager 122 automatically executes a StartAction( ) (or ResumeAction( )) that is associated with the "Modify Code" sub-subtask. In this particular case, StartAction( ) invokes John's editor. Using the editor, John modifies the code.

Now John wants to compile and test the program. To compile the program, John accesses the Actions menu 318. The Actions menu 318 has a "Compile" option, because (in this scenario) the subtask defined "compile" as a manual action to be inherited by all descendants. John selects "Compile" in the Actions menu 318 to compile the program.

To test the newly compiled program, John selects the "Reproduce and Isolate Defect" sub-subtask again. Using the debugger, John confirms that the new program works correctly. John selects "Update Defect" from the actions menu 318 so he can add a description of the defect fix to the defect report. In this scenario, the subtask defined "Update Defect" as a manual action to be inherited by all descendants.

Next, John selects the "Run unit tests" sub-subtask as his current activity. The task manager 122 automatically executes a StartAction( ) (or ResumeAction( )) that is associated with the "Run unit tests" sub-subtask. In this particular case, StartAction( ) is defined such that the unit tests are automatically run on the new code (the particular unit tests to run are automatically determined by the task manager from the file which was edited).

Next, John selects the "Check in Changed Code" sub-subtask as his current activity. The task manager 122 automatically executes a StartAction( )(or ResumeAction( )) that is associated with the "Check in Changed Code" sub-subtask. In this particular case, StartAction( ) is defined such that the code is automatically checked into the version control system.

Later, once a full system build has occurred and John has verified that the fix did not adversely affect anything else, John selects the "Resolve defect at next integration build" sub-subtask as his current activity. The task manager 122 automatically executes a StartAction( ) (or ResumeAction( )) that is associated with the "Resolve defect at next integration build" sub-subtask. In this particular case, StartAction( ) invokes an update utility. The update utility displays the defect in question and a resolve dialog box. The task manager fills in some information (such as which files were modified and the time spent fixing the defect) and John fills in the remaining required information and resolves the defect. This automatically completes his sub-subtask and the task manager 122 updates the status of the other sub-subtasks as well as the parent subtask.

John looks at his task list 308 and sees that the task he shared with his manager has been completed (John can determine this by looking at the annotations). John uses the Notes function in the Task menu 310 to view the notes attached to the task. John sees that his manager approved the request. Now, John is free to reply to the original request and confirm his attendance. Thus, John again selects "Read Electronic Mail" as his task and his mailer comes up. He uses the mailer to send a message to the conference committee.

John also creates a new task to schedule his conference attendance. A subtask of this new task may be an encapsulation of a form-filling package to generate a travel request.

Later, John generates his objectives report for his manager. John runs a reporting program on his task manager. The reporting program extracts tasks from John's task database based on task attributes which John has identified to the reporting program. The reporting program generates a report which has a results section. The results section contains actual times and remaining times for each task.

10.2. Task Manager With Process Engine

A rule-based device (which is also called an inference engine) operates according to rules. For example, a rule may be as follows: "If X happens, do Y." The rule-based device, in executing this rule, would determine whether X happened. If X happened, then the rule-based device would do Y. As shown in FIG. 2A, the rules (or process specifications) are stored in a process specification database 206. Such rule-based devices are well known in the art. The process engine 128 may be implemented as a rule-based device.

The combination of the task manager 122 with the process engine 128 enables automatic process generation. Considering the software debugging environment from the first scenario, for example, note that whenever the user discovers a new defect (while testing the software program in the debugger, for example), the user must manually create a new task for the defect (by using the Create function in the Task menu 310). However, if the process engine 128 is used, then the process engine 128 could monitor an external defect tracking system. When a new defect is submitted, the process engine 128 could automatically create a new task for the defect. The process engine 128 would do this as described in Section 8, wherein the process engine 128 would be operating like a collection of agents 126 (since several independent rule sets may be active). Thus, in this case, the rule would be "If a new defect is reported, create a new task for the defect."

Another example where dynamic task generation would be useful would be to assist John (from the first scenario) in implementing a complex process in use in his lab. For instance, suppose the process requires that every time a piece of code changes, the relevant documentation must also be updated. According to the first scenario, John must find the correct task template in each case (for modifying code in the code development phase, for instance) and then execute the tasks as specified in the template. The problem here is that there may be several choices for task templates for the same task depending on the portion of the software lifecycle. The burden is on John to correctly set up the components of his process (that is, select the correct templates). Once the process is set up, the task manager 122 will help John manage, execute, and complete the process. However, the process engine 128 would help John set up the process.

A primary benefit of using the process engine 128 will be an easily modifiable, declarative process description. Without the process engine, 128, computer-assisted processes can be defined, but they must be hard-coded into encapsulations. Also, any data management services required for managing the task state would have to be reinvented by each encapsulation (for instance, if historical information about tasks were required for making a decision).

Note, however, that the task manager 122 need not be modified to operate with the process engine 128. Rather, the process engine 128 communicates with the task manager 122 in the same manner that agents 126 communicate with the task manager 122. Thus, the task manager message interface, as described above, provides sufficient flexibility for the task manager 122 to operate with external entities. The agents 126 and the process engine 128, as described herein, represent only some of the external entities with which the task manager 122 may operate.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer system for managing task, comprising:

a task database for storing and organizing said tasks, each task having a hierarchy of subtasks for modeling a human process wherein said tasks have task information;

means for defining and creating instances of task classes, wherein each of said tasks belongs to one of said task classes, and wherein each of said task class have associated pre-defined automatic actions and optional manual actions;

a task manager, coupled to said task database, the maintains a hierachical list of said tasks for an individual, wherein said task manager comprises a user interface for interfacing with said tasks, means for enabling a user via said user interface to manually select one of said tasks to process;

means for enabling a computer to automatically selected one of said tasks to process;

means for performing said automatic actions corresponding to said manually or automatically selected task via the computer, wherein said automatic actions are invoked automatically by said task manager at specific times, means for enabling said user to select one of said optional manual actions corresponding to said manually or automatically selected task, wherein said user can select one of said optional manual actions at any time while said task manager processes said manually or automatically selected task, means for performing said optional manual action selected by said user via the computer, means for enabling user interaction with said manually or automatically selected task via the computer, and means for automatically updating said task information based on said processing of said task via the computer; and means for sharing said tasks and said subtasks with external entities and/or other task managers via the computer, wherein said sharing means comprises means for transferring structured electronic mail messages to users and non-users of said task manager via the computer.

2. The system of claim 1, further comprising a message coupled to said task manager.

3. The system of claim 2, wherein said message system comprises:

network means, coupled to external entries and said task manager, for allowing communication between said external entities and said task manager; and message interface means for allowing said external entities to remote control said task manager.

4. The system of claim 3, wherein said message interface means comprises means for exporting said task information to said external entities.

5. The system of claim 3, wherein said message interface comprise means for enabling said external entities to create, delete, modify and share said tasks.

6. The system of claim 2, further comprising a process engine coupled to said message system and said task manager.

7. The system of claim 1, wherein said updating means comprises:

an estimated completion time attribute;

a scheduled time attribute;

a task deadline attribute;

an actual time attribute;

a status attribute; and a time of last status update attribute.

8. The system of claim 7, wherein said updating means comprises:

means for automatically accuring a user's effort as measured in time of said selected task via the computer; and means for automatically storing said user's effort as measured in time in said actual time attribute via the computer.

9. The system of claim 7, further comprising means for automatically archiving said tasks based on said status attribute and said time of last status update attribute via the computer.

10. The system of claim 1, wherein said user interface comprises:

a task list region for displaying a list of said tasks;

a status and operations region for displaying a first set of functions to be used by a user to access a specific task; and a menu bar region for displaying a second set of functions used by said user of processing said specific task.

11. The system of claim 1, wherein said user interface comprises:

means for enabling said user to create said tasks;

means for enabling said user to delete said tasks;

means for enabling said user to modify said task information;

means for displaying said tasks to said user according to said task information; and means for providing task completion and scheduling advice to said user.

12. The system of claim 1, further comprising means for facilitating access to one or more of said optional manual actions.

13. The system of claim 1, wherein said task information comprises pre-defined and user-defined attributes.

14. The system of claim 1, wherein said task database is distributed such that other task managers have a copy of said task database.

15. The system of claim 1, wherein said tasks have associated notes and priorities.

16. The system of claim 1, further comprising means for sharing said tasks and said subtasks between individuals, whereby changes made to said tasks and said subtasks can by synchronized between said individuals via the computer.

17. The system of claim 1, further comprising a library of task templates that aid said user in creating new tasks, wherein said task templates include pre-defined task information.

18. The system of claim 1, further comprising means for recording pre-defined and user-defined attributes, corresponding to activities of user, involved in the completion of said selected task.

* * * * *